Figure 1:
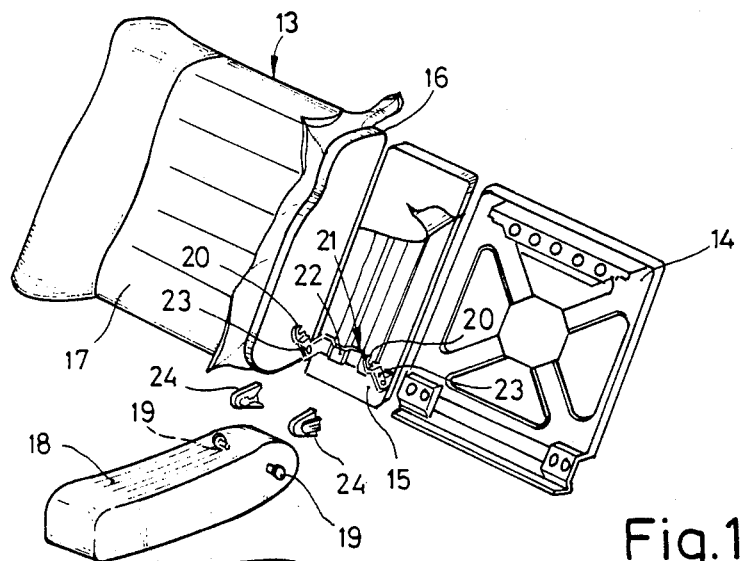
Figure 1:
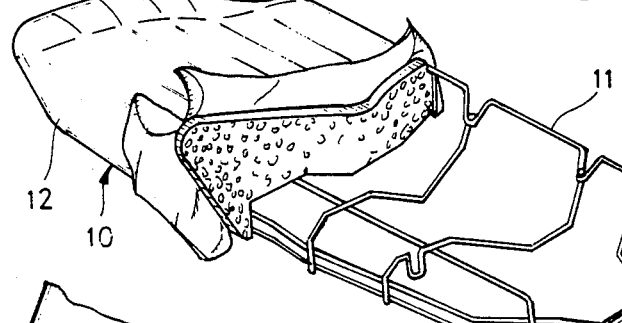

United States Patent [19]

Schrom et al.

[11] Patent Number: 4,759,583

[45] Date of Patent: Jul. 26, 1988

[54] DEVICE FOR RELEASABLY MOUNTING PIVOTABLE ARM RESTS OF SEATS, IN PARTICULAR CENTER ARM RESTS OF MOTOR VEHICLE REAR SEATS

[75] Inventors: Ralf-H. Schrom, Ruesselsheim; Walter P. Trutter, Wiesbaden, both of Fed. Rep. of Germany

[73] Assignee: General Motors Corporation, Detroit, Mich.

[21] Appl. No.: 47,365

[22] Filed: May 6, 1987

[30] Foreign Application Priority Data

May 6, 1986 [DE] Fed. Rep. of Germany ....... 3615261

[51] Int. Cl.⁴ .............................................. A47C 17/04
[52] U.S. Cl. .................................... 297/113; 297/416; 297/417; 297/335
[58] Field of Search ............... 297/113, 115, 417, 335; 403/316, 100, 154, 155

[56] References Cited

U.S. PATENT DOCUMENTS

| | | | |
|---|---|---|---|
| 2,278,308 | 3/1942 | Fairchild | 403/316 |
| 2,841,212 | 7/1958 | DeVos et al. | 297/113 |
| 3,098,677 | 7/1963 | Williams | 297/335 X |
| 3,909,063 | 9/1975 | Bonisch et al. | 297/113 |
| 4,577,905 | 3/1986 | Grant | 297/417 |
| 4,584,737 | 4/1986 | Ohman | 403/155 |

FOREIGN PATENT DOCUMENTS 180054  5/1922  United Kingdom ............... 297/335

Primary Examiner—Francis K. Zugel
Attorney, Agent, or Firm—Ernest E. Helms

[57] ABSTRACT

In an arrangement for releasably mounting pivotable arm rests of seats, especially center arm rests of motor vehicle rear seats, pivot pins which engage on both sides in a support placed on the back rest of the seat are attached to the arm rest.

The support is split so that it has a metal support part with two bearing arms, placed on either side of the arm rest, which have slot-like bearing recesses open at one side and form a first bearing part. The slot-like bearing recesses can each be closed by plastic caps which can be fitted onto the bearing arms. The plastic caps form a second bearing part and simultaneously serve as covers for the bearing points.

9 Claims, 2 Drawing Sheets

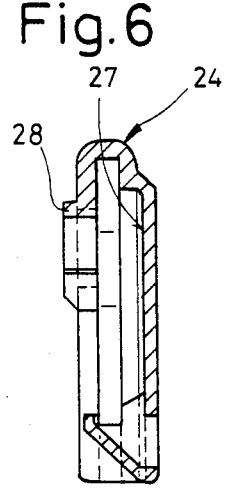
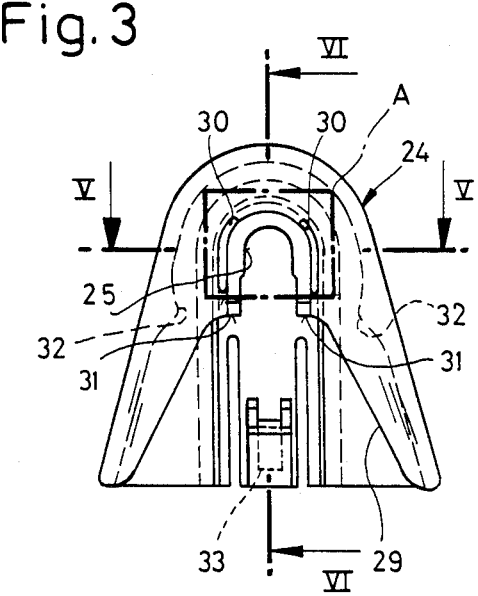
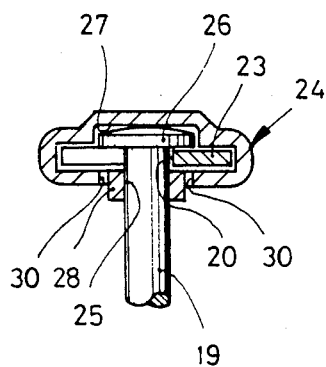
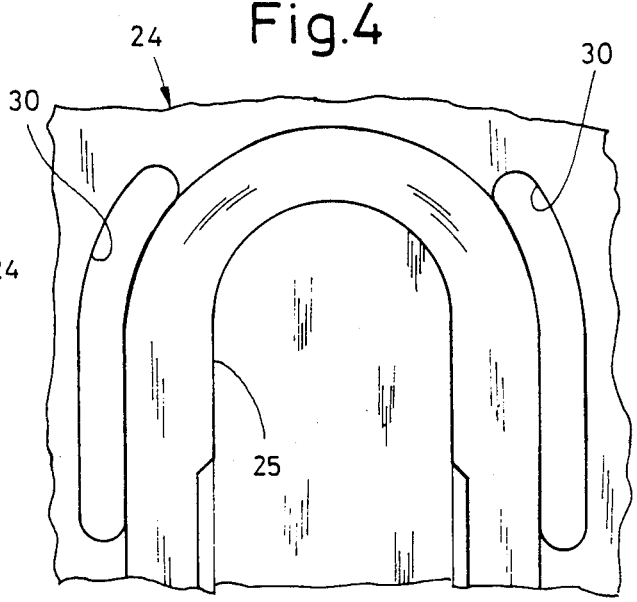

DEVICE FOR RELEASABLY MOUNTING PIVOTABLE ARM RESTS OF SEATS, IN PARTICULAR CENTER ARM RESTS OF MOTOR VEHICLE REAR SEATS

The invention pertains to a device for releasably mounting pivotable arm rests of seats, especially center arm rests of motor vehicle rear seats, with pivot pins which engage on both sides in a support placed on the back rest of the seat being attached to the arm rest.

Known arrangements for releasable mountings for center arm rests of motor vehicle rear seats in most cases consist of riveted or screwed-on hinges. In one known releasable mounting (Audi), the pivot pin, fitted with a head, is placed in a bearing cavity which is closed with a spring-loaded hook. DE-OS No. 33 22 511 discloses another releasable mounting for the center arm rest of a motor vehicle rear seat, in which guide parts which act together with crank-like recessed retainer parts in the back rest are attached to the sides of the center arm rest.

The known center arm rest mountings are characterized by complicated design and high assembly expense. The purpose of the present invention is to create a mounting arrangement of the type mentioned above which is easier and less expensive to manufacture and install than the known mounting arrangements.

According to the invention, the purpose is fulfilled by the fact that the support is split so that it has a metal support portion attached to the back rest, with two bearing arms placed on either side of the arm rest, comprising slot-like bearing recesses open at one end and forming a first part of the support and that the slot-like bearing recesses can each be closed by plastic caps which can be fitted over the bearing arms forming a second part of the support, and that the plastic caps simultaneously serve as covers for covering the bearing points.

With the invention, the advantages of simple assembly of the center arm rest, clearance-free mounting thereof and lower parts costs are achieved. Furthermore, the mounting arrangement according to the invention makes additional means to cover the bearing points superfluous. Moreover, a significant advantage of the invention is the fact that the center arm rest can be installed in the vehicle even after the rear seat back rest has been installed.

Figure 2:
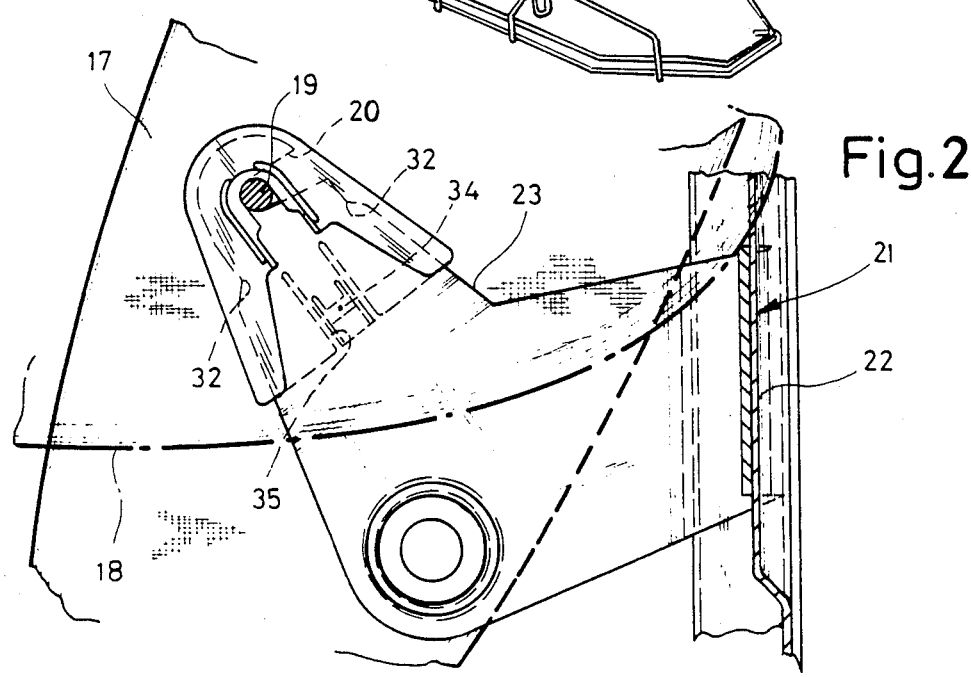

Further details and advantages of the invention may be deduced from the drawing and the following description. The drawings show:

FIG. 1—a rear seat of a passenger car in exploded perspective view;

FIG. 2—the mounting for a center arm rest visible in FIG. 1, in side view;

FIG. 3—a support part for the center arm rest according to FIGS. 1 and 2, configured as a plastic cap, in side view (looking towards the inside);

FIG. 4—detail "A" from FIG. 3, enlarged; FIG. 5—a section along line V—V in FIG. 3; and FIG. 6—a section along line VI—VI in FIG. 3.

In FIG. 1, 10 designates the seat part of a motor vehicle rear seat, which consists of a seat frame 11 and a seat cushion 12 placed thereon (shown in partial section). The back rest of the motor vehicle seat 10 is collectively labeled 13. It has three supporting sheet-metal parts 14, 15 and 16—pivotable toward the front either individually or collectively—which are attached to the bodywork (not shown). Placed on each of the two outer sheet-metal parts 14 and 16 is a back rest cushion, one of which is shown in FIG. 1 and designated 17. This is therefore a rear seat back rest with back rest parts which can individually pivot toward the front. In FIG. 1, however, the back rest 13 is shown in its hinged back position. As FIG. 1 also shows, a center arm rest 18 is pivotably mounted in the region of the center back rest support part 15. This is achieved by means of pivot pins 19, which engage at 20 in a support collectively designated as 21, which is attached on the center sheet-metal part 15 of the rear seat back rest 13. The support 21 is split. It consists of a metal support part 22, attached to the sheet-metal part 15, which has two bearing arms 23 on either side of the arm rest. The bearing arms 23 each have a slot-like bearing recess 20 open on one side. The support part 22 and the bearing arms 23 thus form a first bearing part. The slot-like bearing recesses 20 serve, when the arm rest 18 is in the assembled position, to accommodate the two pivot pins 19 thereon. For this purpose, the slot-like bearing recesses 20 in the bearing arms 23 are oriented approximately perpendicular to the direction of the main forces exerted on the arm rest 18 by a seat occupont. The bearing arms 23 are formed by the two ends of the support part 22 attached to the back rest support element (sheet-metal part 15), such that the bearing arms 23 are bent at approximately a right angle to the plane of the back rest or the plane of the supporting part 22. FIG. 1 shows that the bearing arms are oriented obliquely from lower rear to top front, and that the slot-like bearing recesses 20 thus run obliquely from upper rear to lower front.

The slot-like bearing recesses 20 can each be closed with a plastic cap 24. The plastic caps 24 can each be fitted onto one of the bearing arms 23. They thus form a second bearing part and simultaneously serve as covers for covering the bearing points 19, 20 of the center arm rest 18. The configuration of the plastic caps 24 forming the second bearing part may be seen in detail in FIG. 2, but especially in FIGS. 3-6, according to which each of the plastic caps 24 also has a slot-like bearing recess, labeled 25, which runs approximately perpendicular to the matching slot-like bearing recess 20 of the corresponding bearing arm 23 (FIGS. 1 and 2). The plastic caps 24 are shaped like flat cones, corresponding to the outer contours of the bearing arms 23. The bearing recesses 25 formed into the plastic caps 24 expand conically in the direction of the opening (especially FIG. 3). As FIG. 5 shows, the pivot pins 19 of the center arm rest 18 each have a slightly convex shouldered head 26, which engages behind the associated slot-like bearing recess 20 in the bearing arm 23, such that the head 26 is located in a corresponding recess 27 in the associated plastic cap 24 and is covered by the latter on the outside. As visible especially in FIGS. 5 and 6, the plastic cap 24 has—at 28—in the vicinity of its slot-like bearing recesses 25, an axial extension that is also capable of axially guiding the associated pivot pin 19. The plastic cap 24 therefore has an overall inner contour which corresponds to the outer contour of the bearing arm 23 so that in the installed position, it surrounds the bearing arm on all sides (FIGS. 2 and 5), such that on the inside, only the bearing recess 25, including the conically expanded part 29, is hollowed out. The plastic cap 24 has several important features which have been incorporated to compensate for tolerances and for clearance-free mounting of the pivot pins 19. For example, the slot-like bearing recess 25 in the plastic cap 24 is undersized as compared to the diameter of the pivot pin 19. At the same time, the material of the plastic cap 24 is cut free around the bearing recess 25 (especially FIG. 4). The two cuts are labeled 30 in FIGS. 3 and 4. The undersizing of the bearing recess 25, together with the cuts 30, creates an advantageous spring effect when the pivot pin 19 is mounted in the bearing recess 25 of the plastic cap 24.

Furthermore, formed onto both sides of the inside of the plastic cap 24, approximately in the region of the transition point (labeled 31) between the slot-like bearing recess 25 and the conical expansion 29, is a bulge 32 (especially FIG. 3). This advantageous means makes it possible, in a simple manner, to compensate for play in the fit between the bearing part 23 and the plastic cap 24, and the resulting unavoidable tolerances. When the plastic cap 24 is installed in the corresponding bearing arm 23, the bulge-like projections 32 on the plastic cap 24 are pressed to the side in a sprung manner by the adjacent conical surfaces of the bearing arm 23, thus guaranteeing that the plastic cap 24 fits with no play on the bearing arm 23.

For the purpose of securing the plastic cap 24 in its installed position on the bearing arm 23, the plastic cap 24 has a spring tongue 33 with a snap lug 34, which can be snapped into a corresponding opening 35 in the bearing arm 23 (FIG. 2).

The special means on the plastic cap 24 described above can easily be created in a single working step, if the plastic cap 24 is realized as an injection-molded part.

The embodiments of the invention in which an exclusive property or privilege is claimed are defined as follows:

1. A device for releasably mounting a pivotable arm rest of a vehicle seat, from a back rest of the seat, the arm rest to withstand forces applied by a seat occupant, the arm rest having attached thereto pivot pins with a first diameter on both sides, the device in combination comprising:
   two generally parallel bearing support arms connected with and branching off from the back rest at approximately right angles and said bearing arms being disposed on both sides of the arm rest, both of the bearing arms having on their ends generally opposite the back rest aligned slot-like bearing recesses approximately perpendicular to the direction of forces applied by a seat occupant and the slot-like bearing recesses sloping forwardly and downwardly, and the bearing arm having an opening; and
   plastic caps for releasably fixing on each of the bearing arms by a spring tongue with a latching projection which can be latched into the bearing arms opening, each plastic cap having a slot-like bearing recess extending essentially perpendicular to the slot-like bearing recesses of the bearing arms and the slot-like bearing recess of the plastic cap being undersized in relation to the first diameter of the pivot pin and the plastic caps serve as covers for covering the pivot pins.

2. Device according to claim 1 characterized in that the bearing arms slope forwardly and upwardly.

3. Device according to claim 1, characterized in that the bearing arms and according also the plastic caps have a flat conical shape, and the slot-like bearing recesses formed in the plastic caps diverge conically in the direction of the opening.

4. Device according to claim 1, characterized in that the pivot pin comprises a slightly spherical shouldered head which engages behind the slot-like bearing recess of the bearing arm, and the head is disposed in a corresponding recess in the associated plastic cap and covered on the outside by the latter.

5. Device according to claim 1, characterized in that the plastic cap in the region of its slot-like bearing recess has an axial dimension such that it also serves to guide the pivot pin axially.

6. Device according to claim 3, characterized in that the plastic cap has an inner contour corresponding to the outer contour of the bearing arm so as to encompass the bearing arm on all sides in the assembled position, wherein on the inside, only the bearing recess of the plastic cap, including conically diverging portion, is hollowed out.

7. Device according to claim 1, characterized in that the material of the plastic cap is cut free around the bearing recess.

8. Device according to claim 3, characterized in that inside the plastic cap, approximately in the region of the transition point of the slot-like bearing recess to the conically diverging portion, is formed a bulge on both sides.

9. Device according to claim 5, characterized in that the plastic cap is constructed as a plastic injection-molded part.

* * * * *